United States Patent
Ohno et al.

(10) Patent No.: US 7,892,623 B2
(45) Date of Patent: *Feb. 22, 2011

(54) HONEYCOMB STRUCTURED BODY, MANUFACTURING DEVICE OF HONEYCOMB STRUCTURED BODY AND MANUFACTURING METHOD OF HONEYCOMB STRUCTURED BODY

(75) Inventors: Kazushige Ohno, Gifu (JP); Masafumi Kunieda, Gifu (JP); Kazutake Ogyu, Gifu (JP)

(73) Assignee: Ibiden Co., Ltd, Gifu (JP)

( * ) Notice: Subject to any disclaimer, the term of this patent is extended or adjusted under 35 U.S.C. 154(b) by 650 days.

This patent is subject to a terminal disclaimer.

(21) Appl. No.: 11/320,689

(22) Filed: Dec. 30, 2005

(65) Prior Publication Data

US 2006/0292331 A1    Dec. 28, 2006

(30) Foreign Application Priority Data

Jun. 24, 2005    (JP)    ................ PCT/JP2005/011614

(51) Int. Cl.
  B32B 3/12    (2006.01)
  B29C 65/00    (2006.01)
  B01D 39/06    (2006.01)
  C04B 35/01    (2006.01)

(52) U.S. Cl. .................. 428/116; 156/60; 501/118; 501/153; 501/154; 55/523

(58) Field of Classification Search .............. 428/116, 428/117, 118, 119, 188, 913, 327, 73, 307.5, 428/34.5, 177, 304.4, 192; 55/523, 585.3, 55/483, 502, 529

See application file for complete search history.

(56) References Cited

U.S. PATENT DOCUMENTS 5,518,678 A * 5/1996 Miyamoto et al. ..... 264/177.12

(Continued)

FOREIGN PATENT DOCUMENTS

DE    43 41 159 A1    6/1995

(Continued)

OTHER PUBLICATIONS

Material Safety Data Sheet (MSDS) for Alumina, Science Lab.com, document created Oct. 10, 2005.*

(Continued)

*Primary Examiner*—D. Lawrence Tarazano
*Assistant Examiner*—Nicole T Gugliotta
(74) *Attorney, Agent, or Firm*—Finnegan, Henderson, Farabow, Garrett & Dunner, LLP

(57) ABSTRACT

A honeycomb structured body of the present invention is a honeycomb structured body in which plural pillar-shaped honeycomb units are bonded to one another through sealing material layers, each unit having in the longitudinal direction a large number of cells placed in parallel with a cell wall interposed therebetween. Herein, each honeycomb unit includes inorganic fibers and/or whiskers in addition to inorganic particles. A cross-sectional area of the honeycomb unit on a cross section perpendicular to the longitudinal direction is at least about 5 $cm^2$ and at most about 50 $cm^2$. A region in which a sealing material layer is not formed is provided on both ends of the side faces of each of the honeycomb unit, each of the ends accounting for at least about 0.3% and at most about 5% of the length of the honeycomb structured body.

15 Claims, 9 Drawing Sheets

U.S. PATENT DOCUMENTS

| | | | |
|---|---|---|---|
| 6,066,587 A | 5/2000 | Kurokawa et al. | |
| 6,149,877 A | 11/2000 | Ogai | |
| 6,159,578 A | 12/2000 | Ichikawa | |
| 6,669,751 B1 * | 12/2003 | Ohno et al. | 55/523 |
| 6,764,743 B2 | 7/2004 | Kato et al. | |
| 7,316,722 B2 | 1/2008 | Komori et al. | |
| 2003/0053940 A1 * | 3/2003 | Harada et al. | 422/180 |
| 2003/0170160 A1 | 9/2003 | Morita et al. | |
| 2004/0045267 A1 | 3/2004 | Ichikawa et al. | |
| 2004/0128991 A1 * | 7/2004 | Sakamoto | 60/299 |
| 2005/0025933 A1 | 2/2005 | Masukawa et al. | |
| 2005/0109023 A1 | 5/2005 | Kudo et al. | |
| 2005/0178098 A1 * | 8/2005 | Ono et al. | 55/523 |
| 2005/0227869 A1 * | 10/2005 | Ohno et al. | 502/439 |
| 2005/0247038 A1 | 11/2005 | Takahashi | |
| 2005/0266991 A1 | 12/2005 | Ohno et al. | |
| 2005/0266992 A1 | 12/2005 | Ohno et al. | |
| 2006/0093784 A1 | 5/2006 | Komori et al. | |
| 2006/0172113 A1 | 8/2006 | Kunieda | |
| 2006/0177629 A1 * | 8/2006 | Kunieda | 428/116 |
| 2006/0263574 A1 | 11/2006 | Tsunekawa et al. | |
| 2006/0292332 A1 | 12/2006 | Ohno et al. | |
| 2006/0292333 A1 | 12/2006 | Ohno et al. | |
| 2006/0292334 A1 | 12/2006 | Ohno et al. | |
| 2006/0292335 A1 | 12/2006 | Ohno et al. | |
| 2006/0292337 A1 | 12/2006 | Ohno et al. | |
| 2006/0292338 A1 | 12/2006 | Ohno et al. | |
| 2006/0292339 A1 | 12/2006 | Ohno et al. | |
| 2006/0292340 A1 * | 12/2006 | Ohno et al. | 428/116 |
| 2006/0292341 A1 | 12/2006 | Ohno et al. | |
| 2006/0292342 A1 | 12/2006 | Ohno et al. | |
| 2006/0292393 A1 | 12/2006 | Kunieda | |
| 2007/0004593 A1 | 1/2007 | Ohno et al. | |
| 2007/0039295 A1 | 2/2007 | Ohno | |
| 2007/0077190 A1 | 4/2007 | Ohno | |
| 2008/0118701 A1 | 5/2008 | Ohno et al. | |
| 2008/0119355 A1 | 5/2008 | Ohno et al. | |
| 2008/0176028 A1 | 7/2008 | Ohno et al. | |
| 2008/0187713 A1 | 8/2008 | Ohno et al. | |
| 2008/0241003 A1 | 10/2008 | Ido et al. | |
| 2008/0241005 A1 | 10/2008 | Ido et al. | |
| 2008/0241008 A1 | 10/2008 | Ido et al. | |
| 2008/0260991 A1 | 10/2008 | Konstandopoulos et al. | |

FOREIGN PATENT DOCUMENTS

| | | |
|---|---|---|
| EP | 1 142 619 | 10/2001 |
| EP | 1 249 262 | 10/2002 |
| EP | 1 291 061 A1 | 3/2003 |
| EP | 1 371 406 A1 | 12/2003 |
| EP | 1 384 508 | 1/2004 |
| EP | 1 435 348 A1 | 7/2004 |
| EP | 1 447 535 | 8/2004 |
| EP | 1 479 881 | 11/2004 |
| EP | 1 486 242 A1 | 12/2004 |
| EP | 1 489 277 A1 | 12/2004 |
| EP | 1 674 147 | 6/2006 |
| JP | 5-213681 | 8/1993 |
| JP | 08-012460 | 1/1996 |
| JP | 10-263416 | 10/1998 |
| JP | 2000-102709 | 4/2000 |
| JP | 2001-096116 | 4/2001 |
| JP | 2001-097777 | 4/2001 |
| JP | 2001-190916 | 7/2001 |
| JP | 2001-329836 | 11/2001 |
| JP | 2002-60279 | 2/2002 |
| JP | 2002-326034 | 11/2002 |
| JP | 2003-155908 | 5/2003 |
| JP | 2004-051384 | 2/2004 |
| WO | WO 03/067041 | 8/2003 |
| WO | WO 2005/000445 A1 | 1/2005 |
| WO | WO-2005/002709 A1 | 1/2005 |
| WO | WO-2005/047210 A1 | 5/2005 |
| WO | WO 2005/047210 A1 * | 5/2005 |
| WO | WO-2005/063653 A1 | 7/2005 |

OTHER PUBLICATIONS

PCT International Preliminary Report on Patentability dated Dec. 24, 2007, from PCT application PCT/JP2005/011614. (4 pgs.).
U.S. Appl. No. 11/925,394.
U.S. Appl. No. 11/853,658.
U.S. Appl. No. 11/928,546.
Kazushige Ohno et al.; "Honeycomb Structured Body and Exhaust Gas Converting Apparatus"; U.S. Appl. No. 11/296,494, filed Dec. 8, 2005.
Kazushige Ohno et al.; "Honeycomb Structured Body"; U.S. Appl. No. 11/298,833, filed Dec. 12, 2005.
Kazushige Ohno et al.; "Honeycomb Structured Body"; U.S. Appl. No. 11/298,510, filed Dec. 12, 2005.
Kazushige Ohno et al.; "Honeycomb Structured Body and Method of Manufacturing the Same"; U.S. Appl. No. 11/335,660, filed Jan. 20, 2006.
U.S. Appl. No. 12/194,888.
U.S. Appl. No. 12/238,057.
U.S. Appl. No. 12/245,821.
U.S. Appl. No. 12/246,899.
U.S. Appl. No. 12/246,881.
U.S. Appl. No. 12/239,342.
U.S. Appl. No. 12/246,913.
U.S. Appl. No. 12/246,869.
U.S. Appl. No. 12/248,647.
U.S. Appl. No. 12/248,675.
XP-002375248 (for JP 5-213681) Kawata Seisakusho KK, 1993.

* cited by examiner

HONEYCOMB STRUCTURED BODY, MANUFACTURING DEVICE OF HONEYCOMB STRUCTURED BODY AND MANUFACTURING METHOD OF HONEYCOMB STRUCTURED BODY

CROSS-REFERENCE TO RELATED APPLICATIONS

This application claims benefit of priority based on PCT/JP2005/011614 filed on Jun. 24, 2005. The contents of this application are incorporated herein by reference in their entirety.

BACKGROUND OF THE INVENTION

1. Field of the Invention

The present invention relates to a honeycomb structured body.

2. Discussion of the Background

Conventionally, a honeycomb catalyst generally used for exhaust gas conversion of an automobile is manufactured by supporting a high specific surface area material such as active alumina and the like and a catalyst metal such as platinum and the like on a surface of a cordierite-based honeycomb structured body that has an integral structure and a low thermal expansion property. Moreover, an alkaline earth metal such as Ba and the like is supported thereon as a NOx occlusion agent, so as to be used for treating NOx in an atmosphere with excessive oxygen such as an atmosphere in a lean burn engine and a diesel engine.

Here, in order to improve the converting performance of the honeycomb catalyst, it is necessary to increase the possibility of contact between exhaust gases and the catalyst noble metal as well as the NOx occlusion agent. For this purpose, it is necessary for the support to have a higher specific surface area and for the noble metal to have a smaller grain size and to be dispersed in a high level. Therefore, many kinds of honeycomb structured bodies are proposed in which the cell shape, the cell density, the thickness of cell walls, and the like have been devised (for example, see JP-A 10-263416).

With respect to the honeycomb structured body made of a high specific surface area material, a honeycomb structured body that has been subjected to extrusion molding with inorganic fibers and an inorganic binder has been known (for example, see JP-A 5-213681). Moreover, in order to allow such a honeycomb structured body to have a large size, a structure in which honeycomb units are jointed to one another through an adhesion layer has been known, and honeycomb structured bodies with honeycomb units having a cross-sectional area of 200 $cm^2$ or more have been proposed (for example, see DE 4341159).

The contents of JP-A 10-263416, JP-A 5-213681, and DE 4341159 are incorporated herein by reference in their entirety.

SUMMARY OF THE INVENTION

A honeycomb structured body of the present invention is a honeycomb structured body comprising:
  plural pillar-shaped honeycomb units having in the longitudinal direction a large number of cells placed in parallel with a cell wall therebetween, and
  a sealing material layer through which the plural pillar-shaped honeycomb units are bound to one another, wherein
  each of the honeycomb unit includes inorganic fibers and/or whiskers in addition to inorganic particles,
  a cross-sectional area of the honeycomb unit on a cross section perpendicular to the longitudinal direction is at least about 5 $cm^2$ and at most about 50 $cm^2$, and
  a region in which a sealing material layer is not formed is provided on both ends of the side faces of each of the honeycomb unit, each of the ends accounting for at least about 0.3% and at most about 5% of the length of the honeycomb structured body.

In the above-mentioned honeycomb structured body, it is desirable that the total sum of cross-sectional areas of the honeycomb units on the cross section perpendicular to the longitudinal direction accounts for about 85% or more, more desirably for about 90% or more of the cross-sectional area of the honeycomb structured body on the cross section perpendicular to the longitudinal direction.

In the above-mentioned honeycomb structured body, it is also desirable that a coating material layer is formed on the outermost periphery thereof.

In the above-mentioned honeycomb structured body, it is desirable that the inorganic particles comprise of at least one member selected from the group consisting of alumina, silica, zirconia, titania, ceria, mullite and zeolite and that the amount of the inorganic particle contained in the honeycomb unit is at least about 30% by weight and at most about 97% by weight.

In the above-mentioned honeycomb structured body, it is desirable that the inorganic fibers and/or whiskers comprise of at least one member selected from the group consisting of alumina, silica, silicon carbide, silica-alumina, glass, potassium titanate and aluminum borate. It is also desirable that the aspect ratio (length/diameter) of the inorganic fibers and/or whiskers is at least about 2 and at most about 1000, and that the total amount of the inorganic fibers and/or whiskers contained in the honeycomb unit is at least about 3% by weight and at most about 70% by weight.

In the above-mentioned honeycomb structured body, it is desirable that the honeycomb unit further contains an inorganic binder. The inorganic binder desirably comprises of at least one member selected from the group consisting of alumina sol, silica sol, titania sol, water glass, sepiolite and attapulgite. The amount of the inorganic binder as solid content contained in raw material paste is desirably at least about 5% by weight and at most about 50% by weight.

On the honeycomb structured body, it is desirable that a catalyst is supported, and that the catalyst contains at least one member selected from the group consisting of noble metal, alkali metal, alkaline earth metal and oxide.

Moreover, it is desirable that the above-mentioned honeycomb structured body is used for exhaust gas conversion of a vehicle.

The present invention further comprises a manufacturing device of a honeycomb structured body comprising a cylindrical (can-type) body configured so as to place a ceramic member aggregate which is assembled so that a cavity is formed between a plurality of pillar-shaped honeycomb units; and a paste supplying chamber which is provided on the peripheral portion of the cylindrical (can-type) body and supplies paste to the cylindrical (can-type) body.

It is desirable that an opening communicating with the paste supplying chamber is formed in the cylindrical (can-type) body. Desirably, the opening is formed into a groove shape, and a bottom plate with an intercommunicating pore is provided on both ends of the cylindrical (can-type) body.

Moreover, the present invention comprises a manufacturing method of a honeycomb structured body comprising:

assembling a plurality of pillar-shaped honeycomb units so that a cavity is formed between each of the honeycomb units; and forming a sealing material layer by filling and curing of a sealing material paste between said honeycomb units so that a region in which a sealing material layer is not formed exists on the end portion of said honeycomb unit.

It is desirable that the region in which a sealing material layer is not formed is formed in the region at the end portion of the honeycomb unit that accounts for at least about 0.3% and at most about 5% of the length of the honeycomb unit.

Furthermore, a manufacturing method of a honeycomb structured body comprises at least the following Processes 1 to 4:

Process 1: A process for manufacturing a pillar-shaped honeycomb unit from raw material paste.

Process 2: A process for manufacturing a ceramic member aggregate by assembling a plurality of the honeycomb units so that a cavity is formed between the honeycomb units.

Process 3: A process for filling in the cavity between the honeycomb units with a sealing material paste so that a region in which a sealing material layer is not formed exists at the end portion of the honeycomb unit.

Process 4: A process for curing the sealing material paste to form a sealing material layer between the honeycomb units.

It is desirable that a cavity-holding member is inserted between the honeycomb units.

It is also desirable that in the Process 2, a ceramic member aggregate is manufactured inside a cylindrical (can-type) body by assembling a plurality of the honeycomb units through a cavity-holding member.

It is further desirable that in the Process 2, after manufacturing a ceramic member aggregate by assembling a plurality of honeycomb units through a cavity-holding member, the ceramic member aggregate is stored inside the cylindrical (can-type) body.

The region in which a sealing material layer is not formed is desirably formed in the region at the end portion of the honeycomb unit that accounts for at least about 0.3% and at most about 5% of the length of the honeycomb unit.

It is also desirable that the amount of supply of sealing material paste is adjusted so that a region in which a sealing material layer is not formed exists on the end portion of the honeycomb structured body.

Furthermore, it is desirable that the quality of the material of the cavity-holding member is any of paper, an inorganic substance, an organic fiber and resin. The sealing material paste is desirably a mixture of an inorganic binder and a ceramic particle, a mixture of an inorganic binder and inorganic fiber, or a mixture of an inorganic binder and a ceramic particle. The thickness of the cavity-holding member is desirably at least about 0.5 mm and at most about 2.0 mm.

DESCRIPTION OF THE EMBODIMENTS

Hereinafter, description will be given of a honeycomb structured body of the present invention.

The honeycomb structured body of the present invention is a honeycomb structured body in which plural pillar-shaped honeycomb units are bonded to one another through sealing material layers, each unit having in the longitudinal direction a large number of cells placed in parallel with a cell wall therebetween, wherein each of the honeycomb unit includes inorganic fibers and/or whiskers in addition to inorganic particles, a cross-sectional area of the honeycomb unit on a cross section perpendicular to the longitudinal direction is at least about 5 cm$^2$ and at most about 50 cm$^2$, and a region in which a sealing material layer is not formed is provided on both ends of the side faces of each of the honeycomb unit, each of the ends accounting for at least about 0.3% and at most about 5% of the length of the honeycomb structured body.

The honeycomb structured body of the present invention can disperse catalyst components in a high level, and is resistant to thermal shock and vibration.

The honeycomb structured body of the present invention can be especially used conveniently as a catalytic converter.

Hereinafter, description will be given of the honeycomb structured body of the present invention by making reference to the drawings.

Figure 1A:
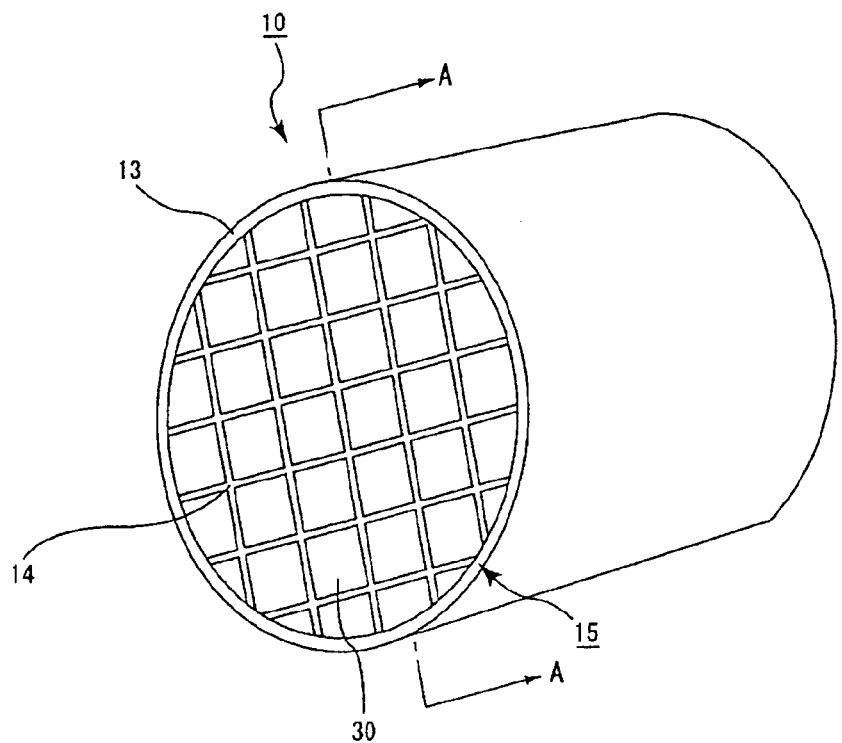
FIG. 1A is a perspective view that schematically shows one example of a honeycomb structured body of the present invention.
Figure 1B:
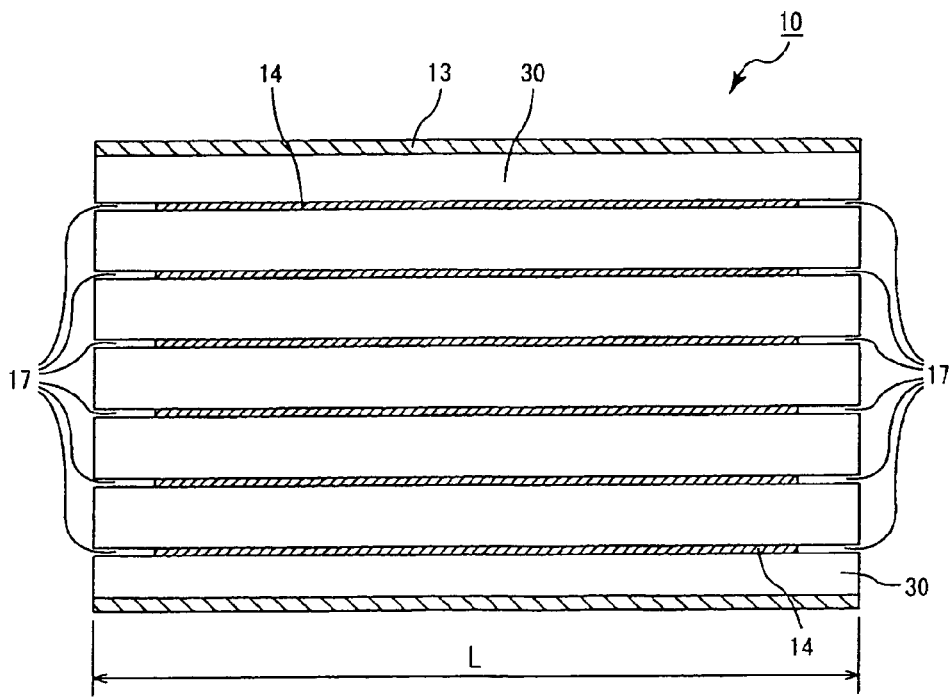
FIG. 1B is a cross-sectional view taken along line A-A of FIG. 1A.
Figure 2:
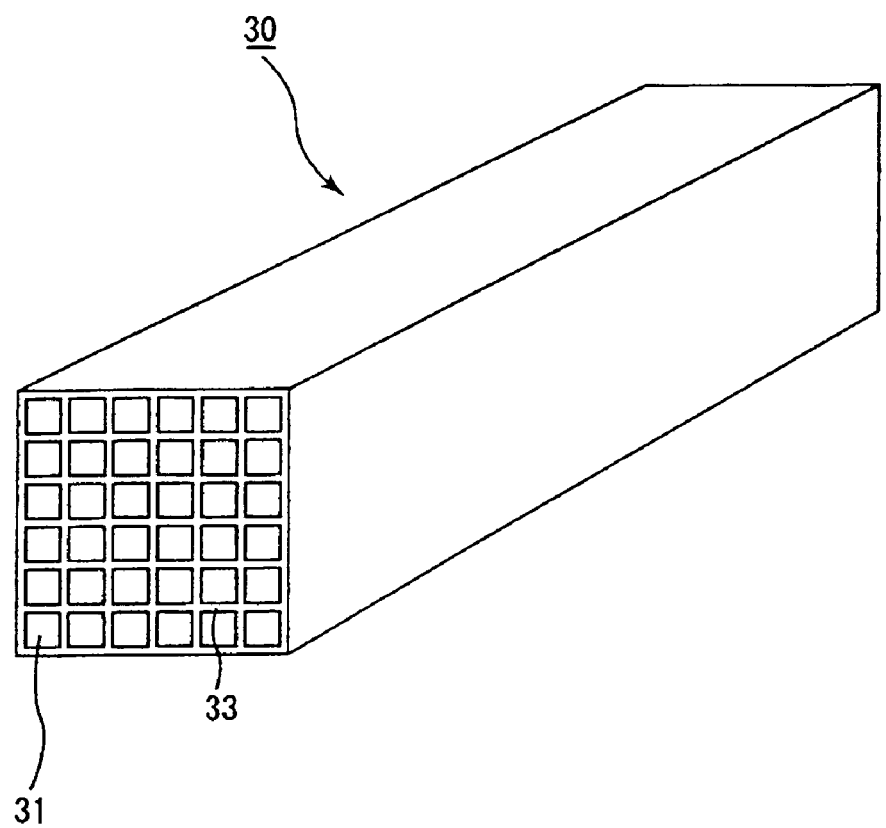
FIG. 2 is a perspective view that schematically shows one example of a honeycomb unit constituting a honeycomb structured body shown in FIG. 1A.

FIG. 1A is a perspective view that schematically shows one example of the honeycomb structured body of the present invention, and FIG. 1B is a cross-sectional view taken along line A-A of FIG. 1A. FIG. 2 is a perspective view that schematically shows a honeycomb unit that forms the honeycomb structured body shown in FIG. 1A.

In the honeycomb structured body 10 of the present invention, as shown in FIG. 1A, a plurality of honeycomb units 30, each including inorganic fibers and/or whiskers in addition to inorganic particles, are bound together through sealing material layers 14 to form a honeycomb block 15, and on the periphery of the honeycomb block 15, a coating material layer 13 is formed. Thus, the coating material layer 13 is formed on the outermost periphery of the honeycomb structured body 10.

As shown in FIG. 2, in the longitudinal direction of the honeycomb unit 30, a number of cells 31 are formed. In FIG. 2, reference numeral 33 represents a cell wall.

As shown in FIG. 1B, in the honeycomb structured body 10, there is a region 17 in which a sealing material layer is not formed which is formed on both ends of the side face of the honeycomb unit 30.

Here, each of the regions 17 in which a sealing material layer is not formed are formed in a region that accounts for at least about 0.3% and at most about 5% of the length L of the honeycomb structured body 10. In other words, a depth of each region 17 in which a sealing material layer is not formed accounts for at least about 0.3% and at most about 5% of the length of the honeycomb structured body.

When the depth of each of the regions in which a sealing material layer is not formed is within the range of at least about 0.3% and at most about 5% of the length of the honeycomb structured body, the honeycomb structured body is allowed to exert excellent durability against thermal shock and vibration.

The reason for this is presumably because a stress generated in the honeycomb structured body can be alleviated by the sealing material layers, and the stress can be dispersed in the honeycomb structured body that tends to have further concentration in stress.

When the depth of each of the regions in which a sealing material layer is not formed is at least about 0.3% and at most about 5% of the length of the honeycomb structured body, a dispersion site for the thermal stress imposed on the end face of the honeycomb structured body becomes large, thereby preventing the occurrence of damages such as cracks and the like on the end face. Moreover, a thermal stress generated on the entire honeycomb structured body can be alleviated sufficiently, and it is difficult for damages such as cracks and the like to occur.

In the honeycomb structured body of the present invention, as shown in FIG. 1A, plural honeycomb units are bonded to one another through sealing material layers.

Therefore, the honeycomb structured body exerts excellent durability against thermal shock and vibration. The reason for this is presumably because, even when a temperature distribution occurs in the honeycomb structured body due to an abrupt temperature change and the like, the temperature difference per honeycomb unit can be reduced to a small level. An alternative presumable reason for this is because the thermal shock and vibration can be alleviated by the sealing material layers. Moreover, even when a crack occurs in the honeycomb unit due to a thermal shock and the like, the sealing material layers can prevent the crack from expanding over the entire honeycomb structured body, and serve as frames of the honeycomb structured body, so that a proper shape as the honeycomb structured body can be maintained with the functions thereof as a catalyst support being maintained.

Here, the cross-sectional area of the honeycomb unit on a cross section perpendicular to the longitudinal direction of the honeycomb structured body (hereinafter, referred to simply as cross-sectional area) is about 5 cm$^2$ in lower limit and about 50 cm$^2$ in upper limit. When the cross-sectional area is at least about 5 cm$^2$ and at most about 50 cm$^2$, the cross-sectional area of the sealing material layers that bond the honeycomb units to one another becomes small, while the specific surface area on which a catalyst is supported becomes relatively large, preventing a pressure loss to become relatively great. Moreover, since the size of the unit does not become too large, it becomes easier to sufficiently suppress the thermal stress generated in each honeycomb unit.

Furthermore, when the cross-sectional area of the honeycomb unit is in the range of at least about 5 cm$^2$ and at most about 50 cm$^2$, the ratio of the sealing material layers in the honeycomb structured body can be adjusted, and thus the specific surface area can be maintained at a high level, making it possible to disperse catalyst components in a high level.

Moreover, even when external forces such as thermal shock and vibration are applied thereto, the shape as the honeycomb structured body can be maintained, and a pressure loss can be suppressed to a low level.

Therefore, in accordance with this honeycomb structured body, the catalyst components can be dispersed in a high level and the durability against thermal shock and vibration can be enhanced.

Here, the specific surface area per unit volume can be calculated by the after-mentioned expression (1).

Moreover, when the honeycomb structured body includes plural honeycomb units which have different cross-sectional areas, the cross-sectional area of the honeycomb unit refers to a cross-sectional area of the honeycomb unit that serves as a basic unit constituting the honeycomb structured body, which normally indicates the honeycomb unit having the largest cross-sectional area.

It is desirable that the lower limit of the cross-sectional area is about 6 cm$^2$, and more desirably about 8 cm$^2$. In contrast, it is desirable that the upper limit of the cross-sectional area is about 40 cm$^2$, and more desirably about 30 cm$^2$.

In the above-mentioned honeycomb structured body, it is desirable that the total sum of cross-sectional areas of the honeycomb units accounts for about 85% or more, more desirably for about 90% or more of the cross-sectional area of the honeycomb structured body on the cross section perpendicular to the longitudinal direction.

When the total sum of cross-sectional areas of the honeycomb units accounts for about 85% or more, as the cross-sectional areas of the sealing material layers become small, while the total cross-sectional areas of the honeycomb units become large, the specific surface area used for supporting the catalyst can be made relatively large, while the pressure loss can be made relatively small.

When the ratio is about 90% or more, the pressure loss can be made smaller.

In the above-mentioned honeycomb structured body, it is desirable that a coating material layer is formed on the outermost periphery.

The peripheral face can be protected thereby, and the strength can be improved.

Although the shape shown in FIG. 1A is a cylindrical shape, the shape of a honeycomb structured body formed by the bonding of plural honeycomb units to one another is not particularly limited to the cylindrical shape and may include, for example, a rectangular pillar shape, a cylindroid shape and the like. Moreover, the size thereof is also not particularly limited.

The honeycomb units that constitute the honeycomb structured body of the present invention include inorganic fibers and/or whiskers in addition to inorganic particles.

Thus, the specific surface area is improved by the inorganic particles, and the strength of the formed porous ceramic is improved by use of the inorganic fibers and/or whiskers.

As the inorganic particles, it is desirable that particles made of alumina, silica, zirconia, titania, ceria, mullite, zeolite, and the like are used. These particles may be used independently, or two or more kinds thereof may be used in combination.

Among these, it is especially desirable to use alumina particles.

It is desirable that the inorganic fibers and whiskers include inorganic fibers and whiskers made of alumina, silica, silicon carbide, silica-alumina, glass, potassium titanate, aluminum borate, and the like.

These particles may be used independently, or two or more kinds thereof may be used in combination.

The aspect ratio (length/diameter) of the above-mentioned inorganic fibers and whiskers is about 2, more desirably about 5, most desirably about 10 in lower limit, and about 1000, more desirably about 800, most desirably about 500 in upper limit.

Here, when there is a distribution in the aspect ratio, the aspect ratio of the inorganic fibers and whiskers is indicated by the average value thereof.

It is desirable that the amount of the inorganic particles contained in the honeycomb unit is about 30% by weight, more desirably about 40% by weight, most desirably about 50% by weight in lower limit.

In contrast, it is desirable that the upper limit thereof is about 97% by weight, more desirably about 90% by weight, most desirably about 80% by weight, and especially desirable when about 75% by weight.

When the content of the inorganic particles is at least about 30% by weight and at most about 97% by weight, the amount of inorganic particles that devote to improvements of the specific surface area becomes relatively large, enabling the specific surface area of the honeycomb structured body to become large, and to disperse a catalyst component in a high level upon supporting the catalyst component. Furthermore, the amount of the inorganic fibers and/or whiskers that devote to improvements in strength can be made relatively large, and a reduction in the strength of the honeycomb structured body can be suppressed.

It is desirable that the total amount of the inorganic fibers and/or whiskers contained in the honeycomb unit is about 3% by weight, more desirably about 5% by weight, most desirably about 8% by weight in lower limit, and that the upper limit thereof is about 70% by weight, more desirably about 50% by weight, most desirably about 40% by weight, and especially desirable when about 30% by weight.

When the total amount of the inorganic fibers and/or whiskers is at least about 3% by weight and at most about 50% by weight, the strength of the honeycomb structured body can be improved, and the amount of inorganic particles that devote to improvements of the specific surface area can be made relatively large, making the specific surface area of the honeycomb structured body large, while enabling a catalyst component to disperse in a high level upon supporting the catalyst component.

Moreover, it is desirable that the honeycomb unit is manufactured by using a mixture containing the inorganic particles, the inorganic fibers and/or whiskers and an inorganic binder.

By using such a mixture containing the inorganic binder, a honeycomb unit that has sufficient strength can be obtained even when the temperature at which a raw molded body is fired is set to a low level.

As the inorganic binder, an inorganic sol, a clay-type binder and the like can be used, and specific examples of the inorganic sol include, for example, alumina sol, silica sol, titania sol, water glass and the like. Moreover, examples of the clay-type binder include, for example, clays having a double-chain structure, such as clay, kaolin, montmorillonite, sepiolite, attapulgite and the like, and clays of the like. These may be used independently, or two or more kinds thereof may be used in combination.

Among these, it is desirable therefor to comprise of at least one kind selected from the group consisting of alumina sol, silica sol, titania sol, water glass, sepiolite and attapulgite is used.

It is desirable that the amount of the inorganic binder that serves as a solid component of a raw material paste prepared in a manufacturing process which will be described later is about 5% by weight, more desirably about 10% by weight, most desirably about 15% by weight in lower limit, and that the upper limit thereof is about 50% by weight, more desirably about 40% by weight, most desirably about 35% by weight.

When the content of the inorganic binder is at least about 50% by weight, sufficient moldability is maintained.

Although the shape of the honeycomb unit is not particularly limited, it is preferable to be designed such that the honeycomb units are easily bonded to one another, and examples of the shape of a cross section perpendicular to the longitudinal direction (hereinafter, referred to simply as "cross section") include a square shape, a rectangular shape, a hexagonal shape, a sector shape and the like.

Moreover, although the thickness of a gap between the cells (thickness of a cell wall) in the above-mentioned honeycomb unit is not particularly limited, it is desirable to be about 0.05 mm, more desirably about 0.10 mm, particularly desirably about 0.15 mm in lower limit, and desirable to be about 0.35 mm, more desirably about 0.30 mm, particularly desirably about 0.25 mm in upper limit.

When the thickness of the cell wall is at least about 0.05 mm and at most about 0.35 mm, a sufficient strength for the honeycomb unit can be obtained. Moreover, the contact area with exhaust gases becomes large, and gases penetrate deeply enough; therefore, the catalyst supported on the inside of the cell wall makes contact with gases efficiently, thereby improving the catalyst performances.

It is desirable that the cell density of the honeycomb unit is about 15.5 cells/$cm^2$ (about 100 cpsi), more desirably about 46.5 cells/$cm^2$ (about 300 cpsi), most desirably about 62.0 cells/$cm^2$ (about 400 cpsi), in lower limit. In contrast, it is desirable that the upper limit of the cell density is about 186 cells/$cm^2$ (about 1200 cpsi), more desirably about 170.5 cells/$cm^2$ (about 1100 cpsi), most desirably about 155 cells/$cm^2$ (about 1000 cpsi).

When the cell density is at least about 15.5 cells/$cm^2$ and at most about 186 cells/$cm^2$, sufficient wall area inside the honeycomb unit that contacts with exhaust gases can be obtained, while the pressure loss can be suppressed, making the honeycomb unit to be fabricated easily.

The cross-sectional shape of cells formed in the honeycomb unit is not particularly limited, and may be formed into an almost triangular shape or an almost hexagonal shape, in addition to a square shape as shown in FIG. 2.

Next, description of one example of a manufacturing method of the honeycomb structured body of the present invention will be given in the order of processes.

First, a raw material paste is prepared, and by using this raw material paste, extrusion-molding and the like is carried out such that a molded body is manufactured.

The material paste may include, for example, a paste, mainly composed of the inorganic fibers and/or whiskers in addition to the inorganic particles, and in addition to these, according to need and depending on the required moldability, the material paste may contain the inorganic binder, an organic binder, a dispersant and a molding assistant.

Although examples of the organic binder are not particularly limited, they may include, for example, methyl cellulose, carboxymethyl cellulose, hydroxyethyl cellulose, polyethylene glycol, phenol resins, epoxy resins and the like.

These may be used independently, or two or more kinds thereof may be used in combination.

It is preferable that the blending quantity of the organic binder is in the range of 1 to 10 parts by weight out of 100 parts by weight of a total of the inorganic particles, the inorganic fibers, the whiskers and the inorganic binder.

Although examples of the dispersant are not particularly limited, they may include, for example, water, an organic solvent (such as benzene), alcohol (such as methanol) and the like.

Although examples of the above-mentioned molding assistant are not particularly limited, they may include, for example, ethylene glycol, dextrin, fatty acid, fatty acid soap, polyalcohol and the like.

Although not particularly limited, it is preferable that mixing and kneading processes are carried out upon preparing the raw material paste, and for example, the mixing process may be carried out by using a mixer, an attritor and the like, and the kneading process may sufficiently be carried out by using a kneader and the like.

Although the method for molding the raw material paste is not particularly limited, it is preferable that the extrusion-molding process as mentioned above and processes of the like are carried out so that the resulting molded body is molded into a shape with cells formed therein.

Next, according to need, a dried body is obtained by drying the resulting molded body, using a dryer.

Examples of the dryer include a microwave dryer, a hot-air dryer, a dielectric dryer, a reduced-pressure dryer, a vacuum dryer, a freeze dryer and the like.

Next, according to need, the resulting dried body is subjected to a degreasing process.

The degreasing conditions are not particularly limited, and are appropriately determined depending on the kinds and amounts of organic substances contained in the molded body, but it is desirable therefor to be at about 400° C. for about 2 hours.

Next, according to need, the molded body which has been subjected to the drying and degreasing processes, is fired.

Although the firing condition is not particularly limited, it is desirable to be in the range of at least about 600° C. and at most about 1200° C., more desirably in the range of at least about 600° C. and at most about 1000° C.

The reason for this is because, at the firing temperature of at least about 600° C. and at most about 1200° C., the sintering of ceramic particles and the like progress, and strength sufficient for the honeycomb structured body can be obtained, while the sintering of ceramic particles and the like can be prevented from progressing too quickly, thereby making a specific surface area per unit volume larger; therefore, the catalyst component to be supported can be sufficiently dispersed in a high level.

Figure 3A:
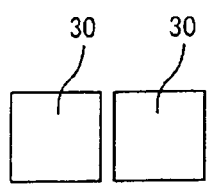
FIGS. 3A to 3F are schematic diagrams that illustrate a manufacturing method of the honeycomb structured body of the present invention.

By using these processes, a pillar-shaped honeycomb unit in which a number of cells are placed in parallel in the longitudinal direction with a cell wall therebetween (see FIG. 3A) can be manufactured.

Figure 3D:
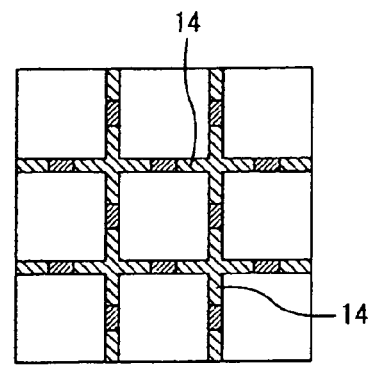
Figure 3B:
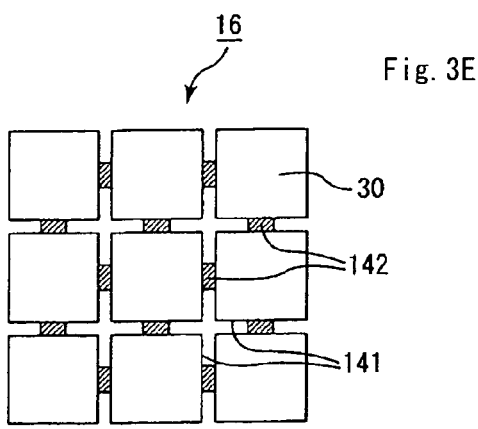

After the honeycomb unit has been formed through the above-mentioned processes, a ceramic member aggregate 16 in which a plurality of honeycomb units 30 are bonded to one another through cavity-holding members 142 is constructed as shown in FIG. 3B.

The cavity-holding members 142 are used for forming a cavity between the respective honeycomb units 30, and by adjusting the thickness of the cavity-holding member 142, the thickness of the sealing material layer 14 between the respective honeycomb units 30 can be adjusted.

The quality of material for the cavity-holding member 142 is not particularly limited, and examples thereof include paper, inorganic substances, organic fibers, resins and the like.

Moreover, the cavity-holding member 142 may be prepared as a material that is decomposed and removed by heat applied to the honeycomb structured body at the time of use thereof, or as a material that is not decomposed nor removed thereby.

Specific examples of the cavity-holding member include, for example, cardboard, graphite, silicon carbide and the like. Moreover, the cavity-holding member may be prepared by using the same quality of material as the sealing material layer 14, by adjusting the thickness and solidifying it thereafter.

The shape of the cavity-holding member 142 is not particularly limited as long as it can hold the honeycomb units 30 together, and examples thereof include a cylindrical shape, a pillar shape and the like.

The size of the cavity-holding member 142 is not particularly limited, and for example, it is desirable that the thickness thereof is in the range of at least about 0.5 mm and at most about 2.0 mm for the cavity-holding member 142 having a cylindrical shape. As is described later, the reason for this is because it is desirable for the sealing material layers forming the honeycomb structured body of the present invention to be in the range of at least about 0.5 mm and at most about 2.0 mm in thickness.

In this process, a ceramic member aggregate 16 in which a plurality of the honeycomb units 30 are configured together through the cavity-holding members 142 is formed by the bonding of the honeycomb units 30 to one another by placing the above-mentioned cavity-holding members 142 between the honeycomb units 30.

Moreover, in the manufacturing method of the honeycomb structured body, a sealing material paste to be used for forming the sealing material layers is prepared in a process apart from the manufacturing processes of the ceramic member aggregate.

Although examples of the above-mentioned sealing material paste are not particularly limited, they may include, for example, a paste formed by mixing an inorganic binder and ceramic particles, a paste formed by mixing an inorganic binder and inorganic fibers, a paste formed by mixing an inorganic binder, ceramic particles and inorganic fibers, and pastes of the like.

Moreover, an organic binder may be added to these sealing material pastes.

Although examples of the organic binder are not particularly limited, they may include, for example, polyvinyl alcohol, methyl cellulose, ethyl cellulose, carboxymethyl cellulose and the like.

These may be used independently, or two or more kinds thereof may be used in combination.

Figure 3E:
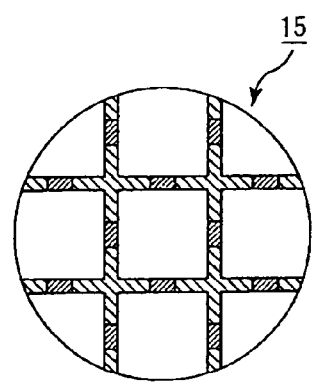
Figure 3C:
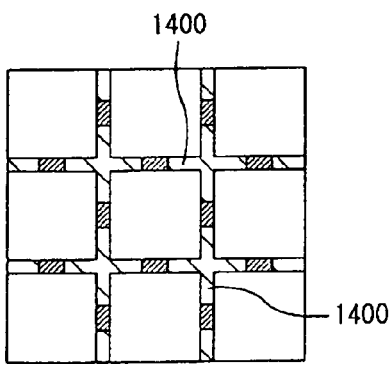

Next, as shown in FIG. 3C, sealing material paste 1400 is injected into a cavity between the respective honeycomb units 30 that constitute the ceramic member aggregate 16.

The injecting process of the sealing material paste may be carried out with the ceramic member aggregate 16 being housed in a cylindrical (can-type) jig for paste injection described later, or the respective honeycomb units 30 may be configured together in the cylindrical (can-type) jig.

The use of the cylindrical (can-type) jig is advantageous because the depth of the region in which a sealing material layer is not formed can be easily adjusted by adjusting the amount of the sealing material paste 1400 which is to be press-injected.

Here, a brief description of the cylindrical (can-type) jig for paste injection will be given by making reference to the drawings.

Figure 4A:
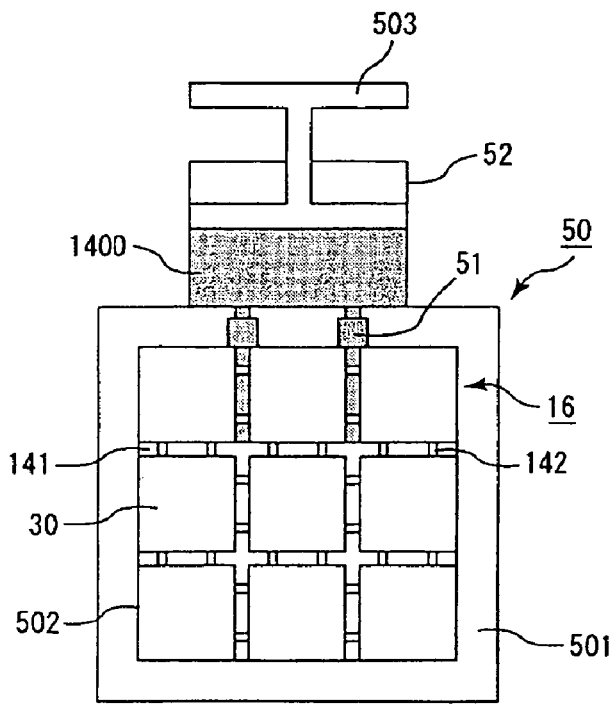
FIG. 4A is a cross-sectional view that schematically shows one example of a cylindrical (can-type) jig for paste injection and a cross section perpendicular to the longitudinal direction of a ceramic member aggregate 16 placed on an inner periphery thereof.
Figure 4B:
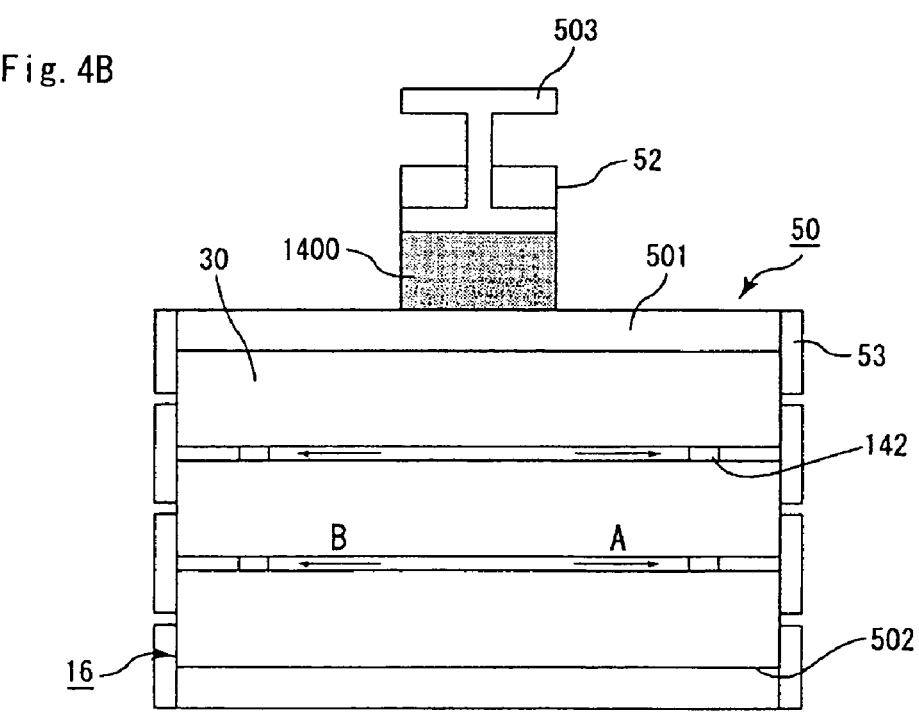
FIG. 4B is a cross-sectional view that schematically shows one example of the cylindrical (can-type) jig for paste injection and a cross section in parallel with the longitudinal direction of the ceramic member aggregate 16 placed on the inner periphery thereof.

FIG. 4A is a cross-sectional view that schematically shows one example of the cylindrical (can-type) jig for paste injection and a cross section perpendicular to the longitudinal direction of the ceramic member aggregate 16 that is placed on the inner periphery thereof, and FIG. 4B is a cross-sectional view that schematically shows one example of the cylindrical (can-type) jig for paste injection and a cross section in parallel with the longitudinal direction of the ceramic member aggregate 16 that is placed on the inner periphery thereof.

The cylindrical (can-type) jig 50 for paste injection is provided with a cylindrical (can-type) body 501 having an interior space 502 in which a ceramic member aggregate is housed. A sealing material paste supplying chamber 52 is attached to the outer side face of this cylindrical (can-type) body 501. An opening 51, which allows the supplying chamber 52 to communicate with the interior space, is formed in the cylindrical (can-type) body 501, and sealing material paste 1400 is supplied via this opening 51 (hereinafter, described more specifically as a supplying hole or a supplying groove). An extruding mechanism 503 used for extruding the sealing material paste 1400 is attached to the supplying chamber 52. Opening- and closing type bottom plates 53 are attached to both ends of the cylindrical (can-type) jig 50 for paste injection. When the bottom plates 53 are closed to seal a cavity 141 formed between the honeycomb units 30 forming the ceramic member aggregate 16, it becomes possible to effectively prevent the sealing material paste 1400 from adhering to the end face of the ceramic aggregate.

In FIG. 4B, arrows A and B in solid lines indicate flows of the press-injected sealing material paste 1400 when the material used for the bottom plates 53 have intercommunicating pores.

The cylindrical (can-type) jig 50 for paste injection is not particularly limited as long as it is a cylindrical (can-type) body with a paste supplying chamber 52 being placed on the outer periphery thereof, the supplying chamber 52 provided with an inner chamber which communicates with the inner periphery through the supplying hole (or the supplying groove) 51, and as long as it has a structure in which a ceramic member aggregate 16 can be placed on the inner periphery thereof, or a structure in which a ceramic member aggregate 16 can be assembled inside the inner periphery. Examples of such jigs may include, for example, an assembling-type jig that can be disassembled, or an integral jig, and the size and/or shape of the inner periphery thereof may be in a predetermined size and/or shape, or the size and/or shape thereof may be changeable by the narrowing of the inner peripheral face which enables the ceramic member aggregate 16 to be bound tightly. Moreover, the cylindrical (can-type) jig 50 for paste injection may be an assembling jig in which the paste supplying chamber 52 can be detached.

The paste supplying chamber 52 is not particularly limited as long as it is a container, placed on the outer periphery of the cylindrical (can-type) jig 50 for paste injection, allows the sealing material paste 1400 to be charged into the inner chamber, and can pressurize the paste charged therein.

The shape, size and number of the supplying holes 51 are not particularly limited, but it is necessary for the position thereof to be at a position corresponding to the cavity 141 formed between the honeycomb units 30 constituting the ceramic member aggregate 16, and it is desirable for the supplying holes 51 to be formed with a fixed interval so that the sealing material paste 1400 can be filled into the cavity 141 without leak. Here, to fill in the paste uniformly, it is more desirable for the supplying holes to be prepared as supplying grooves.

The pressure to be applied upon press-injecting the sealing material paste 1400 into the cylindrical (can-type) jig 50 for paste injection is appropriately adjusted depending on the amount and viscosity of the sealing material paste 1400 to be press-injected, and on the size, positions and number and the like of the supplying holes, and according to need, suction processes may be carried out in combination therewith on both end faces of the cylindrical (can-type) jig 50 for paste injection.

By using this cylindrical (can-type) jig 50 for paste injection, it becomes possible to leave an un-injected portion of the sealing material paste 1400 (which becomes, after being cured, a region in which a sealing material layer is not formed) at the end portions of the ceramic member aggregate 16.

By properly setting the conditions in which the sealing material paste is press-injected, the depth of the region in which a sealing material layer is not formed which is to be prepared can be adjusted.

The cylindrical (can-type) jig 50 for paste injection is used in the following manner.

As shown in FIG. 4A, after the ceramic member aggregate 16 has been assembled, it is housed in the cylindrical (can-type) jig 50 for paste injection. Next, the sealing material paste 1400 is injected. As an alternative, the ceramic member aggregate 16 may be configured inside the cylindrical (can-type) jig 50, and the sealing material paste 1400 may be injected thereafter. Either of these methods may be used.

Next, as shown in FIG. 3D, the sealing material paste 1400 injected to the cavity 141 between the honeycomb units 30 is cured, so that a sealing material layer 14 is formed between the honeycomb units 30.

In this process, the ceramic member aggregate 16 with the sealing material paste 1400 injected therein is heated at the temperature of at least about 50° C. and at most about 150° C. for about one hour, so that the sealing material paste 1400 is dried and cured to form the sealing material layer 14.

It is desirable that the sealing material layer is in the range of at least about 0.5 mm and at most about 2 mm in thickness.

When the thickness of the sealing material layer is at least about 0.5 mm and at most about 2 mm, a sufficient joining strength can be obtained. In addition, since the sealing material layer is a portion that does not function as a catalyst support, the specific surface area per unit volume of the honeycomb structured body can be prevented from being reduced, enabling a catalyst component to sufficiently disperse in a high level at the time of the supporting thereof.

Moreover, when the thickness of the sealing material layer is about 2 mm or less, the pressure loss can be suppressed.

The present embodiment has discussed the method in which: the sealing material layer and the region in which a sealing material layer is not formed are formed by forming the ceramic member aggregate 16 preliminarily and press-injecting the sealing material paste into a cavity between the honeycomb units 30, curing the sealing material paste thereafter. As an alternative of this method, in the manufacturing method of the honeycomb structured body of the present invention, another method may be carried out; a method in which plural honeycomb units can be bonded to one another through the sealing material layers while the region in which a sealing material layer is not formed can be formed by the arranging of the honeycomb units with one after another successively by applying the sealing material paste to a predetermined area on the side faces of the honeycomb units, and the carrying out of the drying and curing of the sealing material paste under the above-mentioned conditions thereafter.

In this process, the number of honeycomb units to be bound together is not particularly limited, and is appropriately determined according to the size of the honeycomb structured body to be manufactured.

Next, the plural honeycomb units bound together through the sealing material layers are, according to need, appropriately cut and subjected to a polishing process and the like, to prepare a honeycomb block 15 (see FIG. 3E).

The cutting process may be carried out by using, for example, a diamond cutter and the like.

Figure 3F:
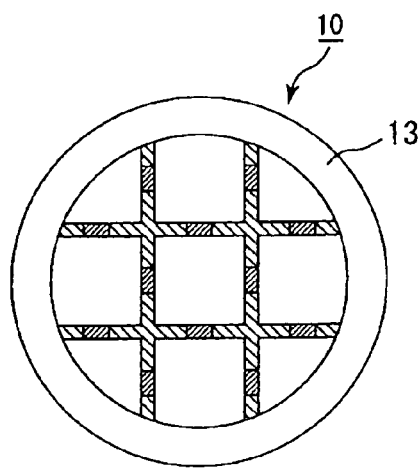

Next, according to need, a coating material paste is applied to the peripheral face of the honeycomb block, and dried and secured thereto, to form a coating material layer 13 (see FIG. 3F).

By the forming of the coating material layer, the peripheral face of the honeycomb block is protected, and as a result, the strength of the honeycomb structured body can be enhanced.

The coating material paste is not particularly limited, and may be made of the same material as the sealing material paste, or may be made of a different material therefrom.

Moreover, when the coating material paste is made of the same material as the sealing material paste, the compounding ratios of constituent components of the two pastes may be the same or may be different from each other.

Although the thickness of the coating material layer is not particularly limited, it is desirable to be in the range of at least about 0.1 mm and at most about 2 mm. When the thickness is at least about 0.1 mm and at most about 2 mm, the outer circumferential face can be protected, increasing the strength of the honeycomb structured body, and reduction of the specific surface area per unit volume in the honeycomb structured body can be suppressed, enabling a catalyst component to sufficiently disperse in a high level upon supporting the catalyst component.

In this manufacturing method, it is desirable that, after plural honeycomb units have been bonded to one another through sealing material layers (when a coating material layer is provided, after the coating material layer has been formed), calcination is carried out.

An organic binder contained in the sealing material layer and the coating material layer can thereby be degreased, leading to removal thereof.

The conditions of the calcination is determined appropriately in accordance with the kinds and amounts of organic substances to be contained therein, and it is desirable therefor to be at about 700° C. for about 2 hours.

Moreover, in the above-mentioned manufacturing method, a honeycomb structured body having a predetermined shape (for example, a cylindrical shape as in FIG. 1A) may be manufactured by forming honeycomb units having a cross section with a sector shape or honeycomb units having a cross section with a square shape preliminarily, and bonding them to one another through sealing material layers.

In this case, cutting and polishing processes can be omitted.

Although the use of such honeycomb structured body of the present invention is not particularly limited, it can be suitably used as a catalyst support for exhaust gas conversion of a vehicle.

When used as a catalyst support for exhaust gas conversion of a diesel engine, the honeycomb structured body is sometimes used together with a diesel particulate filter (DPF) that has a ceramic honeycomb structure made of silicon carbide and the like and also has a function of filtering and burning particulate matters (PMs) in exhaust gases, and in such a case, the positional relationship between the honeycomb structured body of the present invention and the DPF may be such that the honeycomb structured body of the present invention is placed on either the front side (close side to the engine) or the rear side (far side to the engine) of the DPF.

When placed on the front side (close side), heat generated through the reaction of the honeycomb structured body of the present invention is transmitted to the DPF on the rear side (far side), and the temperature raising process at the time of regeneration of the DPF can be accelerated. In contrast, when placed on the rear side (far side), PMs in exhaust gases are filtered through the DPF, and pass through the cells of the honeycomb structured body of the present invention thereafter; therefore, clogging hardly occurs, and gas components generated through incomplete combustion upon burning PMs in the DPF, are also processed by using the honeycomb structured body of the present invention.

Here, the honeycomb structured body can of course be utilized for the purposes and the like described in the aforementioned Background Art, and may also be utilized without being particularly limited. As one example thereof, the honeycomb structured body can be used for purposes in which no catalyst component is supported thereon (for example, adsorbent that adsorbs gaseous components and liquid components, and the like).

Moreover, a catalyst may be supported on the honeycomb structured body so that it can be used as a honeycomb catalyst.

Although examples of the catalyst are not particularly limited, they include, for example, noble metal, alkali metal, alkaline earth metal, oxides and the like.

These materials may be used independently, or two or more kinds of these may be used in combination.

Examples of the above-mentioned noble metal include platinum, palladium, rhodium and the like. Examples of the alkali metal include potassium, sodium and the like. Examples of the alkaline earth metal include barium and the like. Examples of the oxide include perovskite (such as $La_{0.75}K_{0.25}MnO_3$), $CeO_2$ and the like.

Although not particularly limited, the above-mentioned honeycomb structured body (honeycomb catalyst) on which a catalyst is supported is used as so-called three-way catalyst and NOx-occlusion catalyst, used for exhaust gas conversion of a vehicle.

Here, the timing in which the catalyst is supported is not particularly limited, and the supporting process may be carried out after the honeycomb structured body has been manufactured or on inorganic particles serving as the raw material.

Moreover, the supporting method of the catalyst is not particularly limited, and for example, an impregnation method and the like may be used.

EXAMPLES

Hereinafter, description of the present invention will be given in detail by means of examples; however, the present invention is not intended to be limited by these examples.

Example 1

(1) 40% by weight of γ-alumina particles (average particle diameter: 2 μm), 10% by weight of silica-alumina fibers (average fiber diameter: 10 μm, average fiber length: 100 μm, aspect ratio: 10) and 50% by weight of silica sol (solid concentration: 30% by weight) were mixed, and to 100 parts by weight of the resulting mixture were added 6 parts by weight of methylcellulose serving as an organic binder and a slight amount of a plasticizer and a lubricant, and the mixture was further mixed and kneaded to obtain a mixed composition. This mixed composition was extrusion-molded by using an extrusion molding machine, so that a raw molded product was obtained.

(2) Next, the above-mentioned raw molded product was sufficiently dried by using a micro-wave dryer and a hot-air dryer, and further maintained at 400° C. for 2 hours to be degreased.

Thereafter, this was maintained at 800° C. for 2 hours to be fired, so that a honeycomb unit 30, which had a rectangular pillar shape (34.3 mm×34.3 mm×150 mm), a cell density of 93 cells/cm$^2$ (600 cpsi) and a cell wall of 0.2 mm in thickness, with the cross-sectional shape of the cell being formed into a quadrangular shape (square), was obtained.

Figure 5:
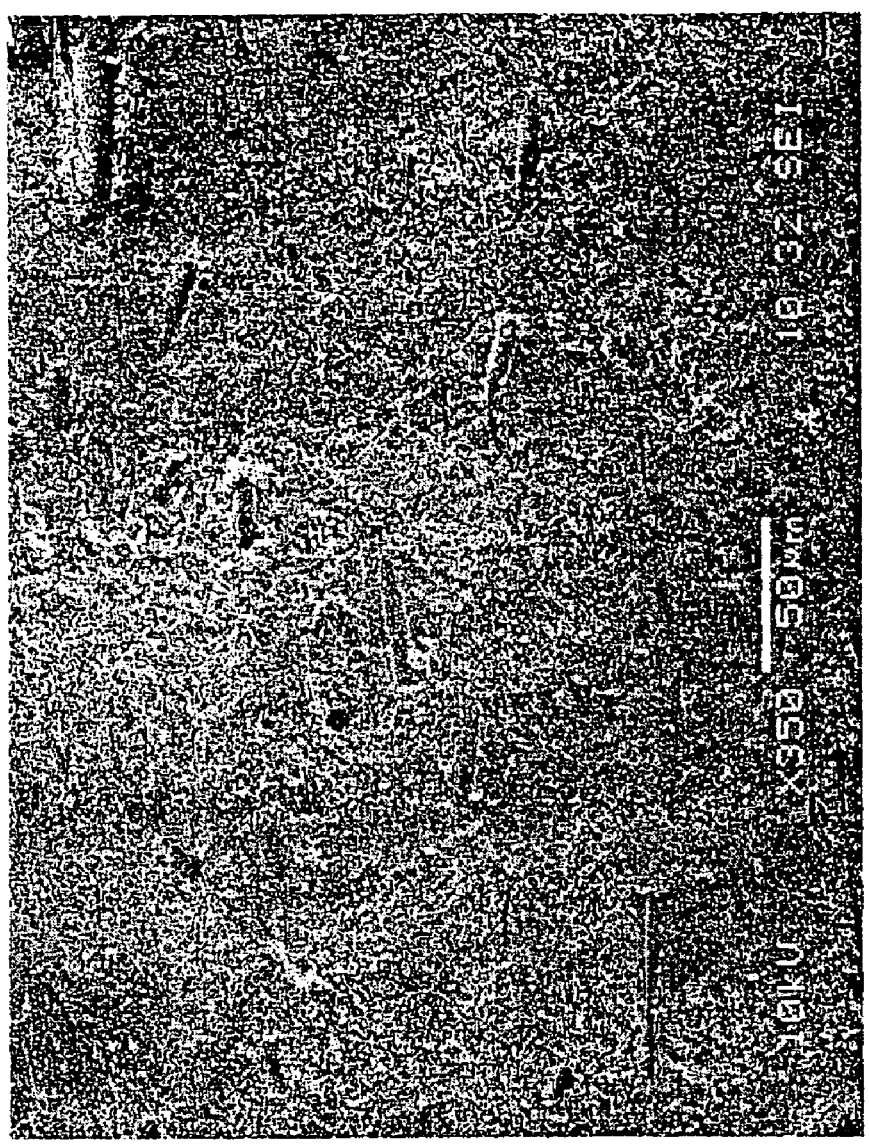
FIG. 5 is a scanning electron microscopic (SEM) photograph that shows cell walls of a honeycomb unit in accordance with Example 1.

FIG. 5 shows a scanning electron microscope (SEM) photograph of the wall face of this honeycomb unit 30.

This photograph indicates that in the honeycomb unit 30, the silica-alumina fibers are oriented along the extrusion direction of the raw material paste.

(3) Next, 29% by weight of γ-alumina particles (average particle size: 2 μm), 7% by weight of silica-alumina fibers (average fiber diameter: 10 μm; average fiber length: 100 μm), 34% by weight of silica sol (solid concentration: 30% by weight), 5% by weight of carboxymethyl cellulose and 25% by weight of water were mixed to prepare a heat-resistant sealing material paste.

Figure 6A:
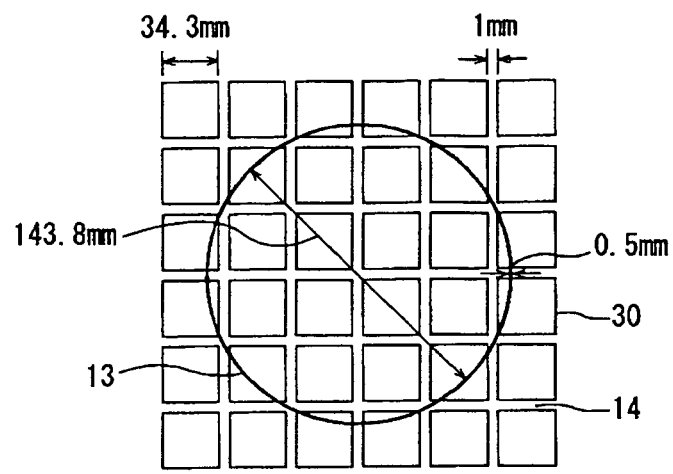
FIG. 6 is an explanatory view that indicates an experimental example in which plural honeycomb units are bonded to one another.

(4) Next, one each, four in total of cavity-holding members 142, each made of a cardboard having a size of 5 mm in diameter×1 mm in thickness, with a sticking material applied to both faces thereof, were placed near the four corners of the side faces of the honeycomb units 30, and secured thereon. Thereafter, the honeycomb units 30 were piled up through the cavity-holding members 142; thus, the ceramic member aggregate 16 was configured (see FIG. 3B and FIG. 6A).

(5) Next, the ceramic member aggregate 16 was placed inside the cylindrical (can-type) jig 50 for paste injection equipped with a paste supplying chamber 52 on the outer periphery thereof. The cylindrical (can-type) jig 50 for paste injection is provided with three supplying grooves having a width of 5 mm that allow the paste supplying chamber 52 to communicate with the inside of the cylindrical (can-type) jig 50 for paste injection, and are placed at positions corresponding to the cavities 141, each formed between the honeycomb units 30 constituting the ceramic member aggregate 16.

Moreover, an opening- and closing type bottom plate 53, which is made in contact with the end faces, was attached to both ends of the cylindrical (can-type) jig 50 for paste injection, and by making the bottom plate 53 in contact with both end faces of the ceramic member aggregate 16, cavities 141 between the honeycomb units 30 were sealed.

(6) Next, sealing material paste 1400 was charged into the paste supplying chamber 52 of the cylindrical (can-type) jig 50 for paste injection, and a pressure of 0.2 MPa was applied thereto for the pressure-injecting of the sealing material paste 1400 to the inner periphery of the cylindrical (can-type) jig 50 for paste injection, and thus the sealing material paste 1400 was injected into each cavity between the honeycomb units 30 (see FIG. 3C). Here, the amount of the sealing material paste 1400 to be pressure-injected was adjusted so that the length of the un-injected portion of the sealing material paste 1400 (the depth of the region in which a sealing material layer is not formed), its measurement starting from the end face of the ceramic member aggregate 16, was 2.0 mm (accounting for 1.33% of the length of the honeycomb unit 30) on respective ends of the ceramic member aggregate 16 of which the sealing material paste 1400 was injected.

Successively, the ceramic member aggregate 16 in which the sealing material paste 1400 was injected between the honeycomb units 30 was dried at 120° C. for one hour, so that the sealing material paste 1400 was cured, and thus, sealing material layers 14, each having a thickness of 1 mm, and regions in which sealing material layers are not formed were formed (see FIG. 3D).

(7) After the forming thereof, the resulting product was cut into a cylindrical shape by using a diamond cutter, making the front face thereof to have an almost point-symmetric pattern, to form the honeycomb block 15 (see FIG. 3E). Thereafter, the same paste as the sealing material paste was applied as a coating material paste onto the circular outer surface on which cells are not formed (outer periphery of the honeycomb block) so that it had a thickness of 0.5 mm, and thus the above-mentioned outer surface was coated.

Next, this was dried at 120° C., and maintained at 700° C. for 2 hours, so that the sealing material paste and the coating material paste were degreased; thus, a honeycomb structured body 10 having a cylindrical shape (143.8 mm in diameter× 150 mm in height) was obtained.

The depth of the region in which a sealing material layer is not formed indicates the average value of the depths measured at three points in each of the sealing material layers between the honeycomb units using a vernier caliper after the honeycomb structured body had been formed.

With respect to the honeycomb structured body manufactured in this example, Table 1 shown below collectively shows various numeric values concerning the cross-sectional shape of the honeycomb unit, the cross-sectional area of the honeycomb unit, the cross-sectional occupied ratio of the honeycomb unit (the ratio of the total sum of the cross-sectional areas of the honeycomb units in the cross-sectional area of the honeycomb structured body), the length (depth) of the region in which a sealing material layer is not formed, the ratio of the region in which a sealing material layer is not formed (the ratio of the region in which a sealing material layer is not formed in the length of the honeycomb structured body), and values of the like.

Here, Table 1 also shows numeric values of each of the other Examples and Comparative Examples.

Examples 2, 3

A honeycomb structured body was manufactured through the same processes as Example 1, except that the shape of the honeycomb unit was as shown in Table 1.

Figure 6B:
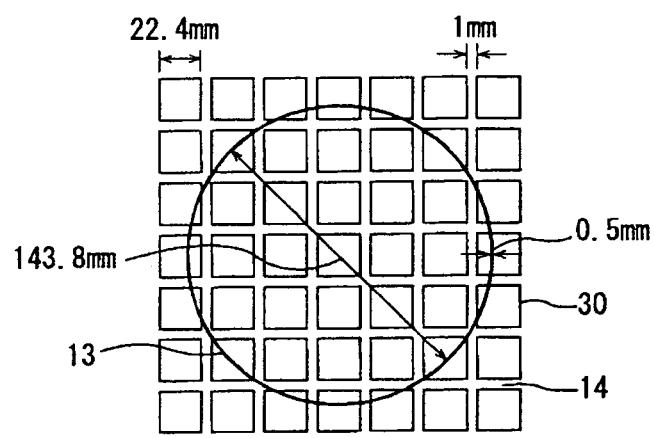
Figure 6C:
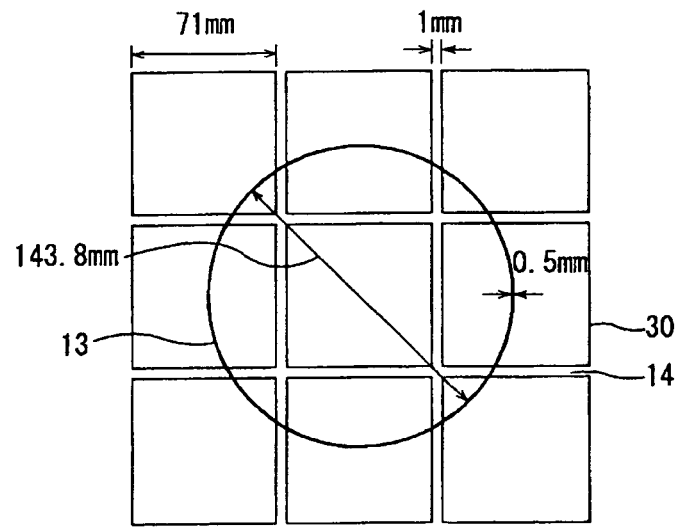

Here, FIGS. 6B and 6C show schematic diagrams viewed from the front side of honeycomb blocks according to Examples 2 and 3, respectively.

Examples 4, 5

A honeycomb structured body was manufactured through the same processes as Example 1, except that the depth of the region in which a sealing material layer is not formed had the length shown as in Table 1.

Here, the depth of the region in which a sealing material layer is not formed was adjusted by adjusting pressure-injecting conditions of the sealing material paste.

Comparative Examples 1, 2

A honeycomb structured body was manufactured through the same processes as Example 1, except that the shape of the honeycomb unit was as shown in Table 1.

Figure 7A:
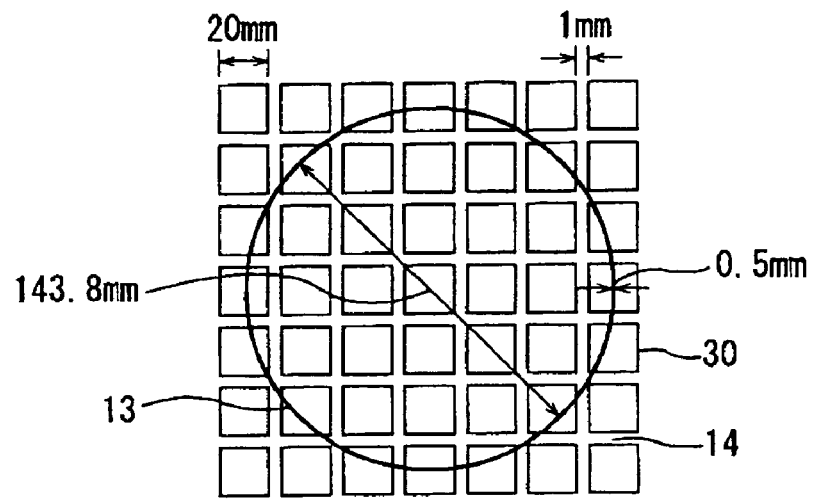
FIG. 7 is an explanatory view that indicates a comparative example in which plural honeycomb units are bonded to one another.
Figure 7B:
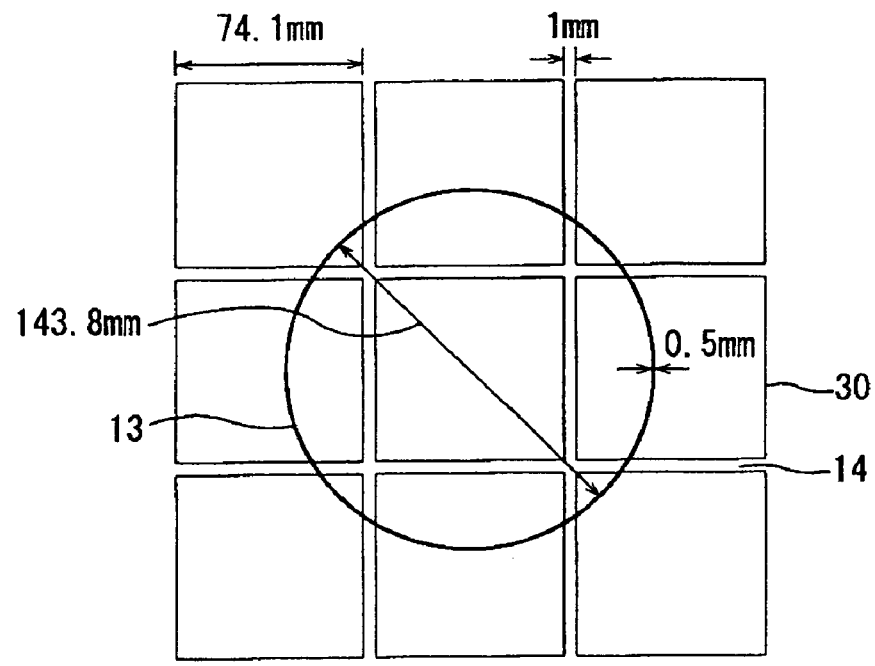

Here, FIGS. 7A and 7B show schematic diagrams viewed from the front side of honeycomb blocks according to Comparative Examples 4 and 5, respectively.

Comparative Examples 3 To 8

A honeycomb structured body was manufactured through the same processes as Example 1, except that the depth of the region in which a sealing material layer is not formed had the length shown as in Table 1.

Here, the depth of the region in which a sealing material layer is not formed was adjusted by adjusting pressure-injecting conditions of the sealing material paste.

Table 1

(1996) defined by Japanese Industrial Standard, by using a BET measuring device (Micromeritics FlowSorb II-2300, made by Shimadzu Corp.). Upon measuring, samples prepared by cutting out cylindrical-shaped small pieces (15 mm in diameter×15 mm in height) were used. Then, the apparent density C (g/L) of the honeycomb unit was calculated through the weight and the volume decided by the shape of the honeycomb units, and the specific surface area S (m²/L) of the honeycomb structured body was calculated from the following expression (1). Here, the specific surface area of the honeycomb structured body refers to a specific surface area per apparent volume of the honeycomb structured body.

$$S(m^2/L) = (A/100) \times B \times C \quad (1)$$

The contents of JIS-R-1626 (1996) are incorporated herein by reference in its entirety.

TABLE 1

| | Honeycomb unit | | | Length of honeycomb structured body (mm) | Region in which a sealing material layer is not formed | | | |
|---|---|---|---|---|---|---|---|---|
| | | | | | Flow-in side | | Flow-out side | |
| | Cross-sectional shape | Cross-sectional area (cm²) | Cross-section occupied ratio (%) | | Length (mm) | Ratio (%) | Length (mm) | Ratio (%) |
| Example 1 | 3.43 cm square | 11.8 | 93.5 | 150 | 2.00 | 1.33 | 2.00 | 1.33 |
| Example 2 | 2.24 cm square | 5.0 | 90.2 | 150 | 2.00 | 1.33 | 2.00 | 1.33 |
| Example 3 | 7.10 cm square | 50.0 | 95.5 | 150 | 2.00 | 1.33 | 2.00 | 1.33 |
| Example 4 | 3.43 cm square | 11.8 | 93.5 | 150 | 0.50 | 0.33 | 0.50 | 0.33 |
| Example 5 | 3.43 cm square | 11.8 | 93.5 | 150 | 7.00 | 4.67 | 7.00 | 4.67 |
| Comparative Example 1 | 2.00 cm square | 4.0 | 89.7 | 150 | 2.00 | 1.33 | 2.00 | 1.33 |
| Comparative Example 2 | 7.41 cm square | 55.0 | 95.6 | 150 | 2.00 | 1.33 | 2.00 | 1.33 |
| Comparative Example 3 | 3.43 cm square | 11.8 | 93.5 | 150 | 0.30 | 0.20 | 0.30 | 0.20 |
| Comparative Example 4 | 3.43 cm square | 11.8 | 93.5 | 150 | 8.00 | 5.33 | 8.00 | 5.33 |
| Comparative Example 5 | 3.43 cm square | 11.8 | 93.5 | 150 | 0.30 | 0.20 | 2.00 | 1.33 |
| Comparative Example 6 | 3.43 cm square | 11.8 | 93.5 | 150 | 8.00 | 5.33 | 2.00 | 1.33 |
| Comparative Example 7 | 3.43 cm square | 11.8 | 93.5 | 150 | 2.00 | 1.33 | 0.30 | 0.20 |
| Comparative Example 8 | 3.43 cm square | 11.8 | 93.5 | 150 | 2.00 | 1.33 | 8.00 | 5.33 |

Evaluation of Honeycomb Structured Body

Measurements on specific surface area, thermal shock/vibration repetitive tests and measurements on pressure loss were carried out on the honeycomb structured bodies thus manufactured in the Examples and the Comparative Examples, by using the following methods. The results are shown in Table 2.

Measurements On Specific Surface Area

First, volumes of honeycomb units and sealing material layers were actually measured, and a ratio A (vol %) of the volume of the honeycomb units in the volume of the honeycomb structured body was calculated. Next, a BET specific surface area B (m²/g) per unit weight of the honeycomb unit was measured. The BET specific surface area was measured through a one-point method in compliance with JIS-R-1626

Thermal Shock/Vibration Repetitive Test

Figure 8A:
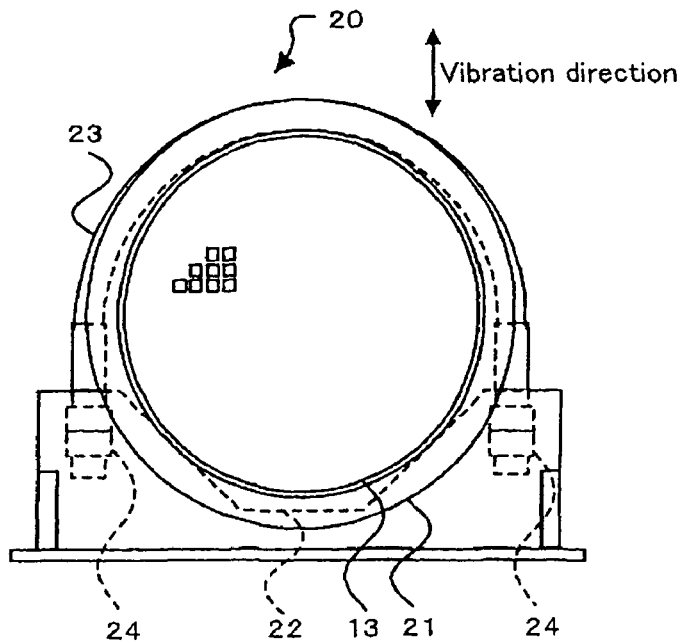
FIG. 8A is a front view of a vibration device used for a vibration test.
Figure 8B:
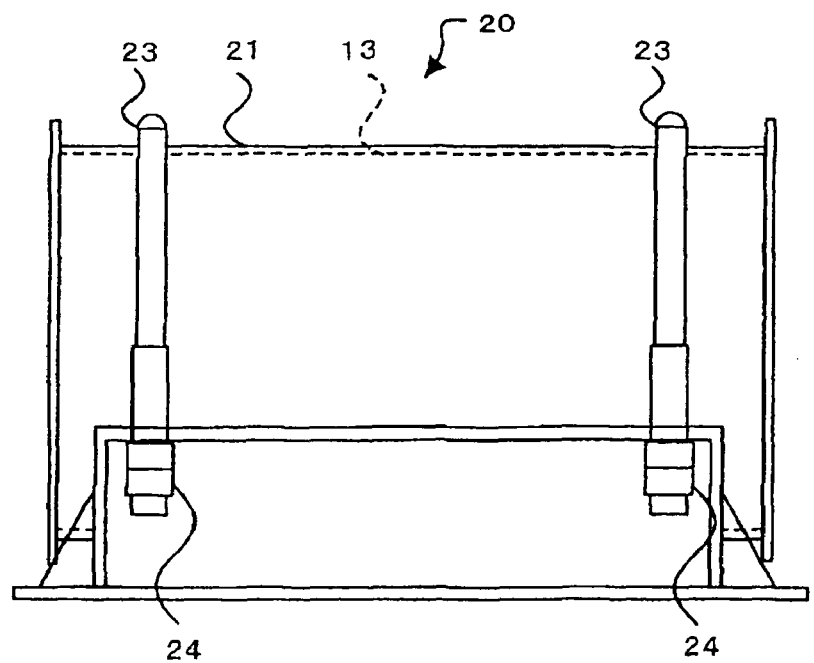
FIG. 8B is a side view of the vibration device.

In a thermal shock test, a honeycomb structured body, being kept in a metal casing 21, with an alumina mat (MAFTEC, 46.5 cm×15 cm, thickness 6 mm, made by Mitsubishi Chemical Corp.), which is a heat-insulating material made of alumina fibers, wound around the peripheral face thereof was put into a firing furnace set at 600° C., and was heated for 10 minutes, and then taken out from the firing furnace and quenched to room temperature. Next, a vibration test was carried out by keeping the honeycomb structured body in this metal casing. FIG. 8A is a front view that shows a vibration testing device 20 used for the vibration test, and FIG. 8B is a side view that shows the vibration testing device 20. The metal casing 21 which held the honeycomb structured body therein was placed on a mount 22, and the metal casing 21 was secured thereon by tightening a securing member 23 having an almost U-shape with a screw 24. Thus, the metal casing 21 was allowed to vibrate with the mount 22 and the securing member 23 being integrally held together therewith. The vibration test was carried out under conditions of a frequency of 160 Hz, an acceleration of 30 G, an amplitude of 0.58 mm and a retention time of 10 hr, at room temperature, and in a vibration direction of the Z-axis direction (up and down). 10 times each of these thermal shock test and vibration test were repeated alternately, and the weight T0 before the tests and the weight Ti after the tests were measured, and the weight reduction ratio G was calculated by using the following expression (2).

$$G(\text{wt \%}) = 100 \times (T0 - Ti)/T0 \quad (2)$$

Pressure Loss Measurement

Figure 9:
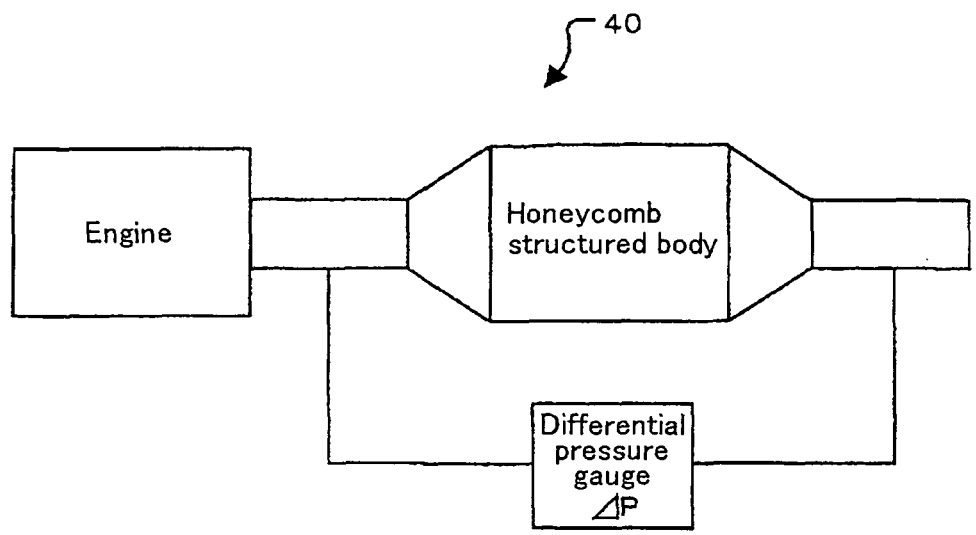
FIG. 9 is a schematic diagram that shows a pressure-loss measuring device.

A pressure-loss measuring device 40 is shown in FIG. 9. In this measuring method, a honeycomb structured body with an alumina mat being wound thereon, which was put into a metal casing, was placed in an exhaust pipe of a common rail-type diesel engine of 2 L, and pressure meters were attached to front and rear sides of the honeycomb structured body. With respect to the measuring conditions, the engine revolution was set to 1500 rpm and the torque was set to 50 Nm, and a differential pressure after a lapse of 5 minutes from the start up was measured.

TABLE 2

| | Specific surface area ($m^2$/L) | | Reduction ratio G (wt %) after | |
|---|---|---|---|---|
| | Honeycomb unit | Honeycomb structured body | thermal shock/vibration test | Pressure loss (kPa) |
| Example 1 | 42000 | 39270 | 0 | 2.4 |
| Example 2 | 42000 | 37884 | 0 | 2.5 |
| Example 3 | 42000 | 40110 | 3 | 2.3 |
| Example 4 | 42000 | 39270 | 6 | 2.4 |
| Example 5 | 42000 | 39270 | 8 | 2.4 |
| Comparative Example 1 | 42000 | 39270 | 0 | 2.8 |
| Comparative Example 2 | 42000 | 39270 | 52 | 2.3 |
| Comparative Example 3 | 42000 | 37674 | 26 | 2.4 |
| Comparative Example 4 | 42000 | 40152 | 36 | 2.4 |
| Comparative Example 5 | 42000 | 39270 | 18 | 2.4 |
| Comparative Example 6 | 42000 | 39270 | 25 | 2.4 |
| Comparative Example 7 | 42000 | 39270 | 15 | 2.4 |
| Comparative Example 8 | 42000 | 39270 | 21 | 2.4 |

As clearly indicated by the above-mentioned test results, in the honeycomb structured bodies according to the Examples, the pressure loss was low, with desirable durability to thermal shock and vibration being maintained.

In contrast, although the honeycomb structured body in which a cross-sectional area of the honeycomb unit was less than 5 $cm^2$ (4 $cm^2$), as in the case of the honeycomb structured body according to Comparative Example 1, had excellent durability to thermal shock and vibration, it was high in pressure loss. Moreover, although the honeycomb structured body in which a cross-sectional area of the honeycomb unit was more than 50 $cm^2$ (55 $cm^2$, as in the case of the honeycomb structured body according to Comparative Example 2, was low in pressure loss, it failed to provide sufficient durability to thermal shock and vibration. Moreover, the honeycomb structured body in which both or either of ends of the region in which a sealing material layer is not formed has the depth of less than 0.3% of the length of the honeycomb structured body or the depth of more than 5% thereof (Comparative Examples 3 to 8), also failed to provide sufficient durability to thermal shock and vibration.

Furthermore, each of the honeycomb structured bodies according to the Examples has a high specific surface area.

What is claimed as new and desired to be secured by Letters Patent of the United States is:

1. A honeycomb structured body, comprising:
    a plurality of straight pillar-shaped honeycomb units each having a longitudinal direction and a large number of cells placed in parallel in the longitudinal direction with a cell wall therebetween; and
    a sealing material layer through which said plurality of the straight pillar-shaped honeycomb units are bound to one another;
    wherein:
    a specific surface area per unit volume of the honeycomb structured body is larger than or equal to 37884 $m^2$/L and smaller than or equal to 40110 $m^2$/L,
    each of said honeycomb units comprises inorganic particles and inorganic fibers and/or whiskers,
    a cross-sectional area of each of said straight pillar-shaped honeycomb units on a cross section perpendicular to the longitudinal direction is at least about 5 $cm^2$ and at most about 50 $cm^2$, and
    each of said straight pillar-shaped honeycomb units including side surfaces having a region not in contact with said sealing material layer, hereby a length of said region is at least about 0.3% and at most about 5% of the length of said honeycomb structured body.

2. The honeycomb structured body according to claim 1, wherein the total sum of cross-sectional areas of said honeycomb units on the cross section perpendicular to the longitudinal direction accounts for about 85% or more of the cross-sectional area of said honeycomb structured body on the cross section perpendicular to the longitudinal direction.

3. The honeycomb structured body according to claim 1, wherein the total sum of cross-sectional areas of said honeycomb units on the cross section perpendicular to the longitudinal direction accounts for about 90% or more of the cross-sectional area of said honeycomb structured body on the cross section perpendicular to the longitudinal direction.

4. The honeycomb structured body according to claim 1, wherein a coating material layer is formed on the outermost periphery.

5. The honeycomb structured body according to claim 1, wherein said inorganic particles comprise of at least one member selected from the group consisting of alumina, silica, zirconia, titania, ceria, mullite and zeolite.

6. The honeycomb structured body according to claim 1, wherein the amount of said inorganic particle contained in said honeycomb unit is at least about 30% by weight and at most about 97% by weight.

7. The honeycomb structured body according to claim 1, wherein said inorganic fibers and/or whiskers comprise of at least one member selected from the group consisting of alumina, silica, silicon carbide, silica-alumina, glass, potassium titanate and aluminum borate.

8. The honeycomb structured body according to claim 1, wherein the aspect ratio (length/diameter) of said inorganic fibers and/or whiskers is at least about 2 and at most about 1000.

9. The honeycomb structured body according to claim 1, wherein the total amount of said inorganic fibers and/or whiskers contained n said honeycomb unit is at least about 3% by weight and at most about 70% by weight.

10. The honeycomb structured body according to claim 1, wherein said honeycomb unit further contains an inorganic binder.

11. The honeycomb structured body according to claim 10, wherein said inorganic binder comprises of at least one member selected from the group consisting of alumina sol, silica sol, titania sol, water glass, sepiolite and attapulgite.

12. The honeycomb structured body according to claim 10, wherein the amount of said inorganic binder as solid content contained in raw material paste is at least about 5% by weight and at most about 50% by weight.

13. The honeycomb structured body according to claim 1, on which a catalyst is supported.

14. The honeycomb structured body according to claim 13, wherein said catalyst contains at least one member selected from the group consisting of noble metal, alkali metal, alkaline earth metal and oxide.

15. The honeycomb structured body according to claim 1, which is used for exhaust gas conversion of a vehicle.

* * * * *

UNITED STATES PATENT AND TRADEMARK OFFICE
CERTIFICATE OF CORRECTION

| | | |
|---|---|---|
| PATENT NO. | : 7,892,623 B2 | |
| APPLICATION NO. | : 11/320689 | |
| DATED | : February 22, 2011 | |
| INVENTOR(S) | : Kazushige Ohno et al. | |

It is certified that error appears in the above-identified patent and that said Letters Patent is hereby corrected as shown below:

Claim 1, col. 20, line 33, "hereby a length" should read -- whereby a length --.

Claim 9, col. 21, line 3, "contained n said" should read -- containing in said --.

Signed and Sealed this
Tenth Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,892,623 B2 | |
| APPLICATION NO. | : 11/320689 | |
| DATED | : February 22, 2011 | |
| INVENTOR(S) | : Kazushige Ohno et al. | |

It is certified that error appears in the above-identified patent and that said Letters Patent is hereby corrected as shown below:

Claim 1, col. 20, line 33, "hereby a length" should read -- whereby a length --.

Claim 9, col. 21, line 3, "contained n said" should read -- contained in said --.

This certificate supersedes the Certificate of Correction issued April 10, 2012.

Signed and Sealed this
First Day of January, 2013

David J. Kappos
*Director of the United States Patent and Trademark Office*